Nov. 27, 1928.
S. M. KASS
1,693,081
DIVIDED PIPE CLAMP
Filed Nov. 2, 1926
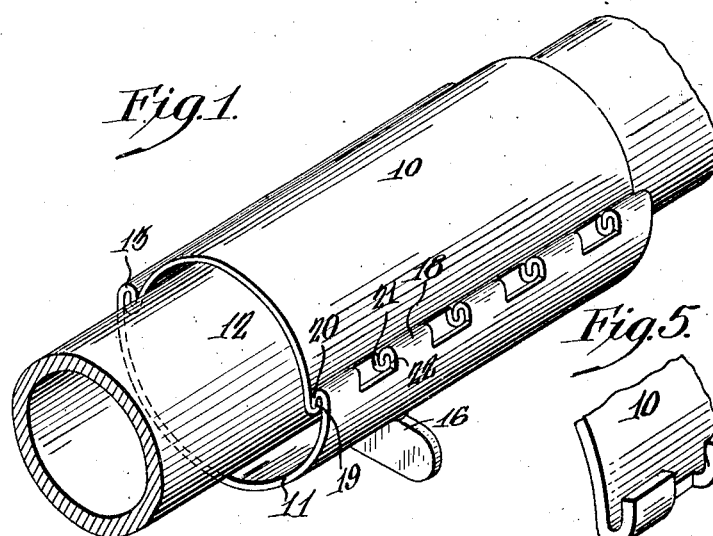
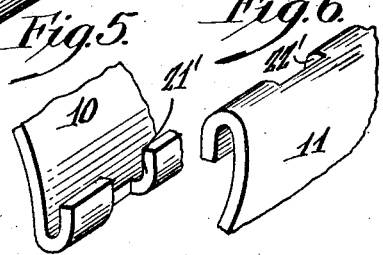
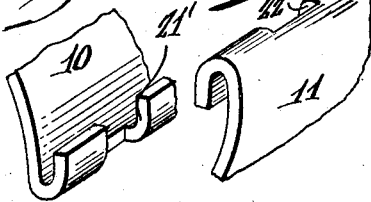
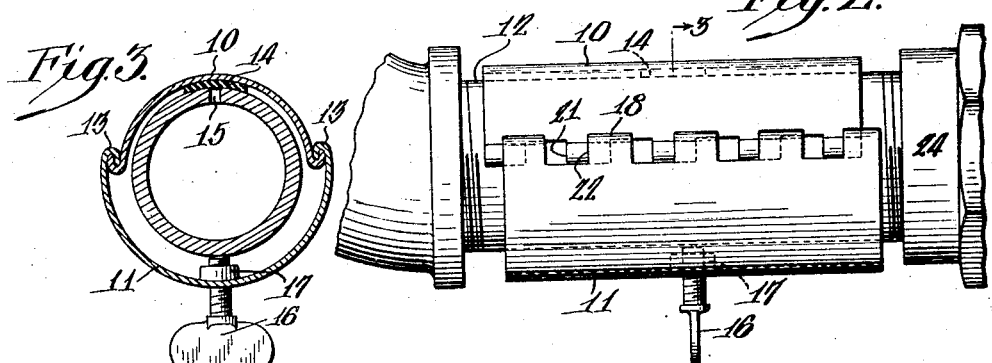
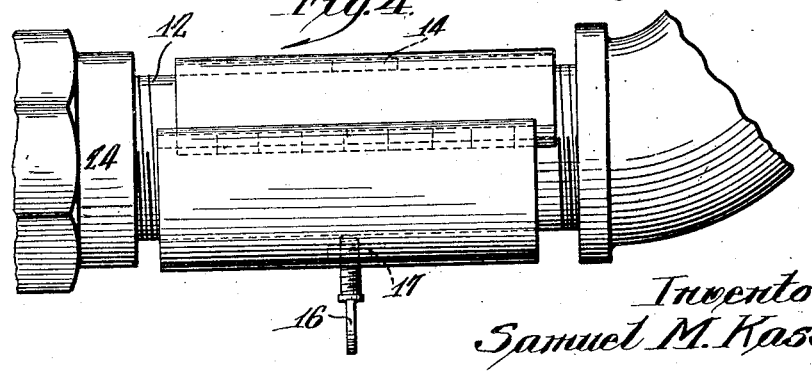

Patented Nov. 27, 1928.

1,693,081

UNITED STATES PATENT OFFICE.

SAMUEL M. KASS, OF PHILADELPHIA, PENNSYLVANIA.

DIVIDED PIPE CLAMP.

Application filed November 2, 1926. Serial No. 145,784.

My invention relates to longitudinally slidable split clamps for repairing holes in pipes.

The main purpose of my invention is to adapt the clamp to insertion in a space where there is insufficient room for sliding the clamp parts to full (double) length.

A further purpose is to split up one side at least of a clamp into short lengths permitting the clamp to be put together by but slight longitudinal movement.

Further purposes will appear in the specification and in the claims.

I have illustrated one form of device with slight modification, selecting a form which is practical and efficient and which explains the invention to advantage.

Figure 1 is a perspective showing my clamp in place upon a pipe of indefinite length.

Figure 2 is a side elevation of a similar clamp partly assembled where the space for assembly is restricted.

Figure 3 is a cross section of Figure 2 taken upon line 3—3.

Figure 4 is a side elevation corresponding to the opposite side of Figure 4 except for a slight modification.

Figures 5 and 6 are fragmentary perspective views of the engaging clamp parts showing a further slight modification.

In the drawings similar numerals indicate like parts.

It is old in clamps to arrange to interfit top and bottom sections, 10 and 11, about a pipe 12 by clincher joints upon both sides of the type shown at 13 in Figure 1. Such a joint is shown in my Patent No. 1,487,337, dated March 18, 1924.

There are also other longitudinal slidable joints by which pipe clamp members may be connected by longitudinal sliding movement. However, these forms require that the sliding joints be inserted at the ends of the clamp sections, requiring room equivalent to twice the length of the sections. This will be seen from Figure 4, as, if both sides had uninterrupted clincher edges as in the case of the outer member on the side shown in this figure, the sections would require double the length of one section for insertion.

In many cases, as in Figure 2, there is not sufficient room lengthwise of the pipe for this insertion and my invention is intended to take care of such situations. That it is suitable for repair where the space is not restricted is shown in Figure 1.

The clamp sections are united about the pipe to form a clamp binding a sealing patch 14 over a leak 15 in the pipe and the pressure is brought to bear upon the patch by thumb screw 16 fitting in any suitable thread 17.

By my invention the clincher joint on one at least of the clamp sides, as at 18, is split up into sections made up of lengths of engaging clincher edge 19 upon the outer section 10, and 20 upon the inner section 11 alternating respectively with spaces 21 in section 10 and 22 in section 11. The spaces between the clincher engaging edges are long enough to permit the engaging clincher edges of the other clamp member to pass through them. Spaces 21′ and 22′ in Figures 5 and 6 have not been cut through completely as in other figures but barely permit the engaging clincher edges to pass through them.

Since one edge of each of the clamp sections can be fitted together without longitudinal movement, or independent of the extent of this movement, I have shown continuous clincher contact between the two sections on one side in Figure 1 notwithstanding that the same construction could be used here as on the opposite side in this figure.

In such a situation, as seen in Figures 2 and 3 for example, where the pipe section in which the leak takes place has an elbow at one end and a coupling 24 at the other end and the distance between them is less than twice the length of the clamp, there is real need of such a device as that shown. The opposite side to that seen in Figure 2 may have outer and inner engaging clincher edges continuous, as in Figure 1, or may have both edges on the opposite side split or may have either of these edges split and the other continuous.

The disadvantage of having both sides of the clamp like the side shown in Figure 2 lies chiefly in the fact that both must be "matched up" for engagement whereas with one edge of either clamp part continuous on the opposite side of the clamp this opposite side becomes a pivot about which the parts may be supported and swung while the side shown in Figure 2 is being coupled up and slid into locking position.

In Figure 4 a slightly modified construction is shown in which the outer coupling has a continuous clincher edge and the inner coupling is split up into engaging edge sections and spaces. In order that this member may be used interchangeably end for end the split shown in Figure 4 corresponds with a split of the edge in Figure 2. If the outer edge were the one split it would be desirable to have the lengths and placings of its alternating clincher engaging edges and spaces correspond with those in the edge seen in Figure 2 upon this outer member so that in this case the outer section or part could be used interchangeably end for end.

In operation the clincher edges at one side are interfitted by tangential movement and are used as the pivot for swinging one or both parts into position, staggered to pass the engaging edges through spaces in the other parts and allowing the parts to be slid one upon or within the other to the extent of the spaces.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. A clamp for pipe repairs comprising divided clamp parts one having a continuous clincher edge adapted to cooperate with a clincher edge of the other and both having interrupted clincher parts at the opposite edges adapted to interfit with partial longitudinal displacement of the parts and a tightening device carried by one of the divided parts adapted to engage the pipe and draw the other toward the pipe.

2. An outer clamp member, an inwardly turned clincher edge along one edge thereof, a plurality of spaced inwardly turned clincher edges upon the opposite edge thereof, an inner clamp member, an outwardly turned clincher edge upon the inner member cooperating with the outer clincher member, a plurality of outwardly turned clincher sections upon the opposite edge of the inner clincher member adapted in slightly shifted position to clinch with the interrupted clincher sections upon the outer member and a tightening device carried by one of the clamp members adapted to engage the pipe and draw the other clamp member against the pipe.

SAMUEL M. KASS.